(12) United States Patent
Platvoet

(10) Patent No.: US 6,821,490 B2
(45) Date of Patent: Nov. 23, 2004

(54) PARALLEL FLOW GAS PHASE REACTOR AND METHOD FOR REDUCING THE NITROGEN OXIDE CONTENT OF A GAS

(75) Inventor: Erwin M. J. Platvoet, Jersey City, NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 610 days.

(21) Appl. No.: 09/793,448

(22) Filed: Feb. 26, 2001

(65) Prior Publication Data

US 2002/0159925 A1 Oct. 31, 2002

(51) Int. Cl.[7] .......................... B01D 50/00; B01D 53/34
(52) U.S. Cl. ...................................... 422/177; 422/172
(58) Field of Search ............................... 422/177, 172, 422/173, 176, 180, 181

(56) References Cited

U.S. PATENT DOCUMENTS

| | | | |
|---|---|---|---|
| 2,472,254 A | | 6/1949 | Johnson |
| 3,887,683 A | | 6/1975 | Abe et al. |
| 4,160,009 A | | 7/1979 | Hamabe |
| 4,160,805 A | | 7/1979 | Inaba et al. |
| 4,199,554 A | | 4/1980 | Araki et al. |
| 4,246,234 A | | 1/1981 | Kittrell et al. |
| 4,268,482 A | | 5/1981 | Arashi et al. |
| 4,282,115 A | * | 8/1981 | Atsukawa et al. ........... 502/218 |
| 4,283,368 A | | 8/1981 | Harada et al. |
| 4,285,838 A | | 8/1981 | Ishida et al. |
| 4,302,431 A | | 11/1981 | Atsukawa et al. |
| 4,405,562 A | | 9/1983 | Zardi et al. |
| 4,576,799 A | | 3/1986 | Wörner et al. |
| 4,602,673 A | | 7/1986 | Michelfelder et al. |
| 4,678,643 A | | 7/1987 | Fetzer |
| 4,682,470 A | | 7/1987 | Shaff |
| 4,725,416 A | | 2/1988 | Kristof et al. |

(List continued on next page.)

FOREIGN PATENT DOCUMENTS

| | | |
|---|---|---|
| DE | 35 05351 A1 | 8/1986 |
| DE | 35 06940 A1 | 8/1986 |
| EP | 0 161 470 | 11/1985 |
| EP | 0 555 719 A1 | 8/1993 |
| WO | WO 98/03249 | 1/1998 |
| WO | WO 00/53904 | 9/2000 |

*Primary Examiner*—M. Alexandra Elve
(74) *Attorney, Agent, or Firm*—Dilworth & Barrese, LLP

(57) ABSTRACT

A parallel flow reactor for the selective catalytic reduction of nitrogen oxide in a gas stream includes a shell enclosing an interior space in which is located a plurality of substantially parallel planar catalyst beds, each containing a catalyst for the selective conversion of $NO_x$. Deflectors in the spaces between the catalyst beds direct the flow of gas through the beds. An injector upstream of the catalyst beds introduces a reducing agent such as ammonia into the inlet gas stream. The catalyst bed can include monolith or microengineered catalyst.

11 Claims, 8 Drawing Sheets

U.S. PATENT DOCUMENTS

| | | | |
|---|---|---|---|
| 4,726,935 A | 2/1988 | Inatsune et al. | |
| 4,732,743 A | 3/1988 | Schmidt et al. | |
| 4,739,826 A | 4/1988 | Michelfelder et al. | |
| 4,820,492 A | 4/1989 | Wada et al. | |
| 4,828,806 A | 5/1989 | Flockenhaus et al. | |
| 4,830,833 A | 5/1989 | Shaff | |
| 4,867,953 A | 9/1989 | Riekert et al. | |
| 4,880,378 A | 11/1989 | Hums | |
| 4,900,340 A | 2/1990 | Zuideveld et al. | |
| 4,903,755 A | 2/1990 | Michelfelder et al. | |
| 4,916,107 A | 4/1990 | Brand et al. | |
| 4,950,473 A | 8/1990 | Flockenhaus et al. | |
| 4,961,917 A | 10/1990 | Byrne | |
| 5,047,220 A | 9/1991 | Polcer | |
| 5,078,973 A | 1/1992 | Kuroda et al. | |
| 5,104,629 A | 4/1992 | Dreschler | |
| 5,139,757 A | 8/1992 | Topsoe | |
| 5,145,652 A | 9/1992 | Veser et al. | |
| 5,155,083 A | 10/1992 | Yoshida et al. | |
| 5,275,230 A | 1/1994 | Balling et al. | |
| 5,318,755 A | 6/1994 | Kuivalainen et al. | |
| 5,380,499 A | 1/1995 | MacInnis | |
| 5,401,479 A | 3/1995 | Matros et al. | |
| 5,437,851 A | 8/1995 | MacInnis | |
| 5,474,751 A | 12/1995 | Sigling et al. | |
| 5,478,530 A * | 12/1995 | Swanson | 422/170 |
| 5,531,968 A | 7/1996 | Steenackers | |
| 5,567,392 A | 10/1996 | Becker et al. | |
| 5,603,909 A | 2/1997 | Varner et al. | |
| 5,678,625 A | 10/1997 | Schlüter et al. | |
| 5,694,869 A | 12/1997 | Breen et al. | |
| 5,728,356 A | 3/1998 | Iida et al. | |
| 5,738,024 A | 4/1998 | Winegar | |
| 5,756,059 A | 5/1998 | Zamansky et al. | |
| 5,814,284 A | 9/1998 | Schlüter | |
| 5,817,282 A | 10/1998 | Radlein et al. | |
| 5,820,838 A | 10/1998 | Tsuo et al. | |
| 5,914,015 A * | 6/1999 | Barlow et al. | 204/177 |
| 5,918,555 A | 7/1999 | Winegar | |
| 5,985,222 A | 11/1999 | Sudduth et al. | |
| 5,988,115 A | 11/1999 | Anderson et al. | |
| 6,019,068 A | 2/2000 | Tsuo et al. | |
| 6,048,510 A | 4/2000 | Zauderer | |
| 6,066,303 A | 5/2000 | Sudduth et al. | |
| 6,080,376 A | 6/2000 | Iida et al. | |

* cited by examiner a = Corrugation height
b = Pitch length

PARALLEL FLOW GAS PHASE REACTOR AND METHOD FOR REDUCING THE NITROGEN OXIDE CONTENT OF A GAS

BACKGROUND OF THE INVENTION

1. Field of the Invention

The invention herein relates to a chemical reactor and method for catalytically reducing the content of nitrogen oxide in a gas, particularly flue or stack gas, resulting from the combustion of fuel.

2. Description of the Related Art

The combustion of fuels in various industrial processes often generates undesirable oxides of nitrogen ($NO_x$), usually in the form of nitric oxide (NO) and nitrogen dioxide ($NO_2$). High combustion temperatures tend to produce more $NO_x$. Because $NO_x$ is harmful to the environment, efforts have been made to reduce the emission of $NO_x$ in gases produced by industrial processes involving the combustion of fuel, particularly gases resulting from the operation of power plants, thermal cracking furnaces, incinerators, internal combustion engines, metallurgical plants, fertilizer plants and chemical plants.

Methods for selectively reducing the $NO_x$ content of a flue gas are known. Generally, such methods involve the reaction of $NO_x$ with a reducing agent, optionally in the presence of a catalyst. The selective non-catalytic reduction ("SNCR") of $NO_x$ with a reducing agent such as ammonia or urea requires a relatively high temperature, e.g., in the range of from about 1600° F. to about 2100° F.

Alternatively, the reduction of $NO_x$ with ammonia can be performed catalytically at a much lower temperature, e.g., from about 500° F. to about 950° F., in a process known as selective catalytic reduction ("SCR").

One problem associated with the treatment of flue gas using conventional SCR methods and apparatus is that the weight and bulk of the equipment necessary to achieve satisfactory removal of $NO_x$ requires that it be located at ground level. Many industrial plants need to be retrofitted with $NO_x$ removal ("deNOx") equipment in order meet the requirements of more stringent government regulations. However, because of the physical bulk of the deNOx system, the flue gas must be diverted to ground level for treatment and then sent back into a stack for subsequent exhaust to the atmosphere. To avoid the large cost of such a system it would be highly advantageous to provide a relatively lightweight deNOx unit which can be incorporated directly into the stack.

SUMMARY OF THE INVENTION

In accordance with the present invention, a parallel flow gas phase reactor is provided for the chemical conversion of nitrogen oxide in a gas stream and comprises:

a) a shell having interior and exterior surfaces, a gas stream inlet for receiving an inlet gas stream having an initial concentration of nitrogen oxide and a gas stream outlet through which treated gas of reduced nitrogen oxide concentration relative to the nitrogen oxide concentration of the inlet gas stream is discharged;

b) an injector for introducing a reducing agent into the inlet gas stream; and, c) a plurality of substantially planar catalyst beds within the reactor shell, each catalyst bed containing at least one nitrogen oxide conversion catalyst for the selective catalytic reduction of nitrogen oxide in the inlet gas stream to provide a treated gas of reduced nitrogen oxide concentration, the catalyst beds being oriented substantially parallel with, and in spaced-apart relationship to, each other and to the interior surface of the reactor shell with gas flow passageways therebetween, the passageways each including a gas stream deflector positioned therein for directing the flow of inlet gas stream through at least one catalyst bed and treated gas to the gas stream outlet, each catalyst bed being a monolith or catalyst supported on a mesh-like structure having a porosity greater than about 85%.

The parallel flow reactor of this invention provides a relatively lightweight unit for the selective catalytic reduction of $NO_x$ in a gas, in particular flue gas produced by the combustion of a fossil fuel in a furnace, and is readily incorporated into furnaces equipped with stacks of conventional design, thus lending itself well to retrofit installation in existing units.

BRIEF DESCRIPTION OF THE DRAWINGS

Various embodiments of the parallel flow reactor of this invention and preferred catalyst arrangements employed therein are described below with reference to the drawings wherein.

DETAILED DESCRIPTION OF PREFERRED EMBODIMENTS

As used herein the terms "stack" and "flue" are used synonymously. All quantities should be understood as being modified by the term "about" or "approximately". Composition percentages are by weight unless specified otherwise.

The term "nitrogen oxide" as used herein refers to any oxide of nitrogen, such as NO, $NO_2$, $NO_2O_4$, $N_2O$ and any of their mixtures, and is alternatively designated "$NO_x$".

The reactor and method for the selective catalytic reduction of $NO_x$ of this invention preferably employ ammonia as the reducing agent. $NO_x$ reacts with ammonia in the presence of catalyst to produce nitrogen and water as shown in the following equation (not stoichiometrically balanced):

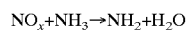

The parallel flow gas phase reactor and deNOx method described herein can be used in any application requiring the treatment of a $NO_x$-containing gas to reduce its $NO_x$ content. Typical combustion equipment producing high levels of $NO_x$ include power plants, fluid catalytic cracking (FCC) regenerators, glass furnaces, thermal crackers, and the like. The deNOx method herein will be particularly described in conjunction with a thermal cracking unit for producing olefins (e.g., ethylene, propylene, butylene, etc.) from a saturated hydrocarbon feedstock such as ethane, propane, naphtha, and the like. However, the reactor and method can be used with any combustion equipment or process which generates a gas containing undesirable levels of $NO_x$.

Figure 1B:
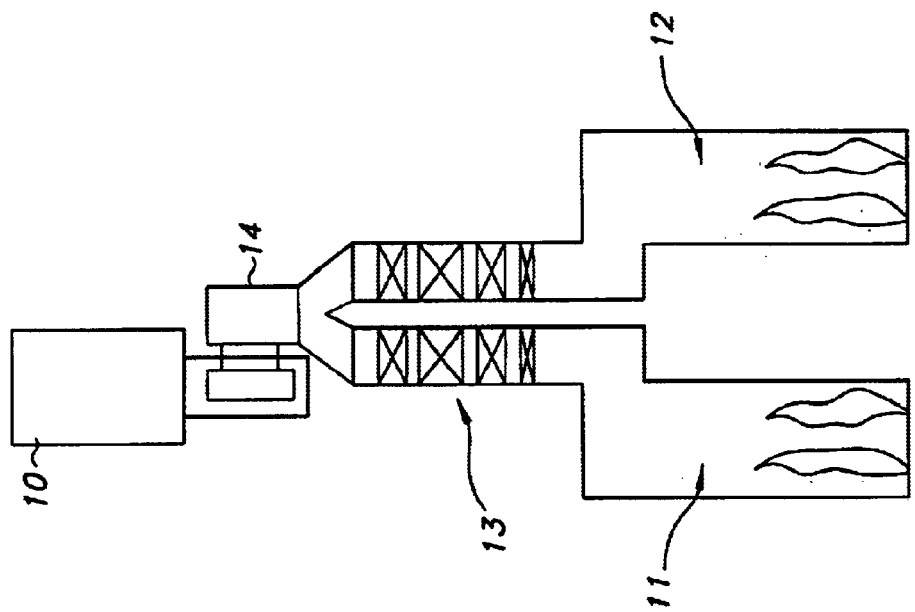
FIG. 1B is a side view of FIG. 1A.
Figure 1A:
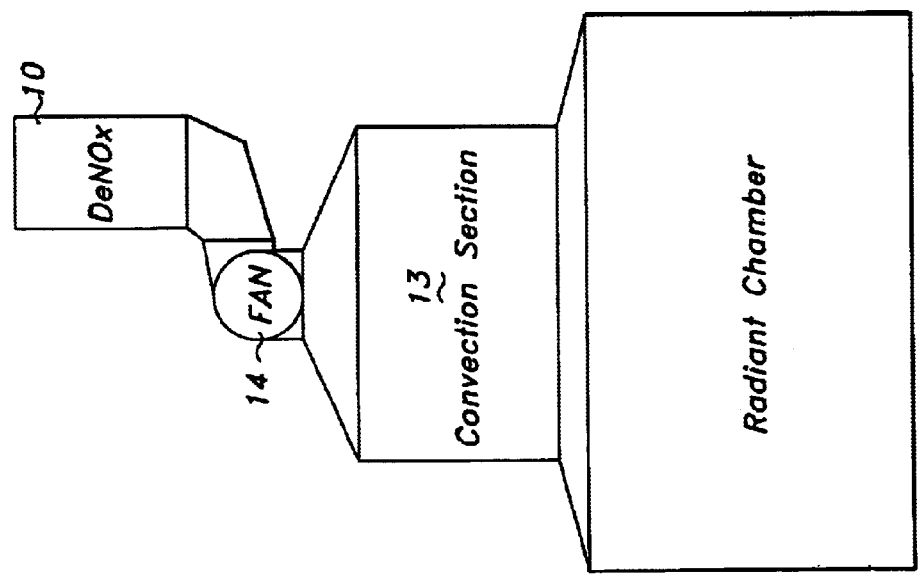
FIG. 1A is a diagrammatic view of a furnace system of a known type incorporating the parallel flow reactor of the present invention in its stack section.

Referring now to FIGS. 1A and 1B, parallel flow gas phase deNOx reactor 10 is illustrated in conjunction with a thermal cracking system employing twin furnaces 11 and 12 having a radiant combustion chamber operating at about 2200° F. for the cracking of the feedstock. Each furnace produces a flue gas which exits therefrom through respective stacks. Typically, the flow rate of flue gas in each stack ranges from about 100,000–300,000 lbs/hr. The flue gas typically contains the following components:

| Nitrogen | 60–80 vol % |
| Oxygen | 1–4 vol % |
| Water vapor | 10–25 vol % |
| Carbon dioxide | 2–20 vol % |
| Nitrogen oxide | 50–300 ppm. |

The flue gases exiting the radiant chamber are typically at a temperature of about 1800° F. Each stack optionally includes a convection section 13 which includes heat exchange equipment through which the flue gas is passed for heat recovery. The flue gas typically exits the convection section at a temperature of from about 300° F.–500° F., although the heat recovery process can be adjusted to provide flue gas temperatures outside this range. The flue gases of the separate stacks are then joined and moved by fan 14 into deNOx system 10. Fan 14 increases the pressure of the flue gas for moving the gas through the deNOx system 10.

Figure 2:
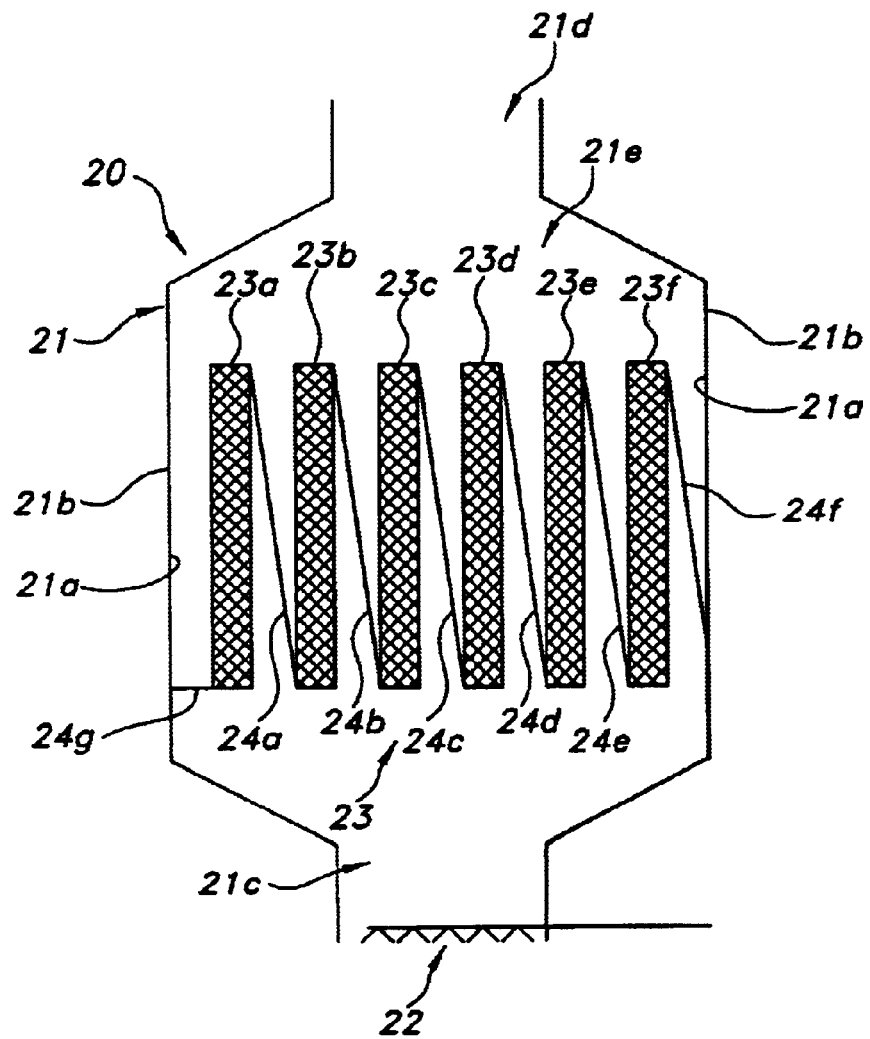
FIG. 2 is a diagrammatic view of a parallel flow reactor.

Referring now to FIG. 2, in one embodiment, parallel flow gas phase reactor 20 includes a reactor shell 21 having an interior surface 21a and exterior surface 21b. Shell 21 includes a gas stream inlet 21c through which inlet gas containing an initial concentration of $NO_x$ is received, a gas stream outlet 21d through which treated gas containing a reduced concentration of $NO_x$ is discharged, and a passageway 21e communicating with gas stream outlet 21d providing for the passage of treated gas thereto.

Injector 22 can be any type of injector known in the art for introducing a reducing agent. Typically, such injectors include a grid-like portion positioned in the inlet gas stream upstream of the catalyst bed. The grid-like portion includes a collection of sparger tubes with injection nozzles arranged in an evenly distributed manner. Generally, the reducing agent is injected in a direction opposite that of the flow of inlet gas. The reducing agent is preferably ammonia but may alternatively be, or additionally include, urea, an alkyl amine or other suitable reducing agent. Injector 22 can be positioned within the inlet 21c or upstream of the inlet 21c.

The reactor includes at least two catalyst beds 23, each bed containing at least one catalyst for the selective reduction of nitrogen oxide. The preferred temperature for the selective catalytic reduction reaction will typically range from about 380° F. to about 550° F., more preferably from about 400° F. to 450° F. Generally, the lower the temperature, the greater amount of catalyst is required to achieve a predetermined level of $NO_x$ conversion. In cases where the flue gas temperature is undesirably low, a burner or other source of heat can be used to increase the flue gas temperature. Alternatively, convection section 13 of the furnace system can be configured to provide a flue gas having a temperature suitable for selective catalytic reduction of $NO_x$.

Catalysts for the selective reduction of nitrogen oxides in the presence of reducing agent are known in the art. Representative examples of such catalysts include, but are not limited to, oxides of vanadium, aluminum, titanium, tungsten and molybdenum. Zeolites can also be used. Examples of the latter include ZSM-5 modified with protons, or with copper, cobalt, silver, zinc, or platinum cations or their combinations. It is to be understood, however, that the scope of the present invention is not limited to a specific SCR catalyst or catalyst composition.

As shown in FIG. 2, a plurality of catalyst beds 23a, 23b, 23c, 23d, 23e and 23f are spaced apart from each other and arranged in substantially parallel vertically oriented planes. The spaces between the catalyst beds provide passageways for gas stream flow therebetween. Gas stream deflectors fabricated from gas impervious material such as sheet metal are positioned in an inclined orientation between the catalyst beds to direct the parallel flow of inlet gas containing reducing agent laterally through the catalyst beds. For example. deflector 24a extends from the upper edge of catalyst bed 23a to the lower edge of adjacent catalyst bed 23b. Deflector 24b extends from the upper edge of catalyst bed 23b to the lower edge of adjacent catalyst bed 23c. Similarly, deflectors 24c, 24d and 24e are positioned between respective catalyst beds in an inclined orientation and extend from the upper edge of one bed to the lower edge of the adjacent bed. Deflector 24f extends from the upper edge of catalyst bed 23f to the inner surface 21a of the shell. Wall 24g extends from the lower edge of catalyst bed 23a substantially horizontally to the inner surface 21a of the shell so as to prevent the inlet gas stream from bypassing the catalyst beds.

Figure 4A:
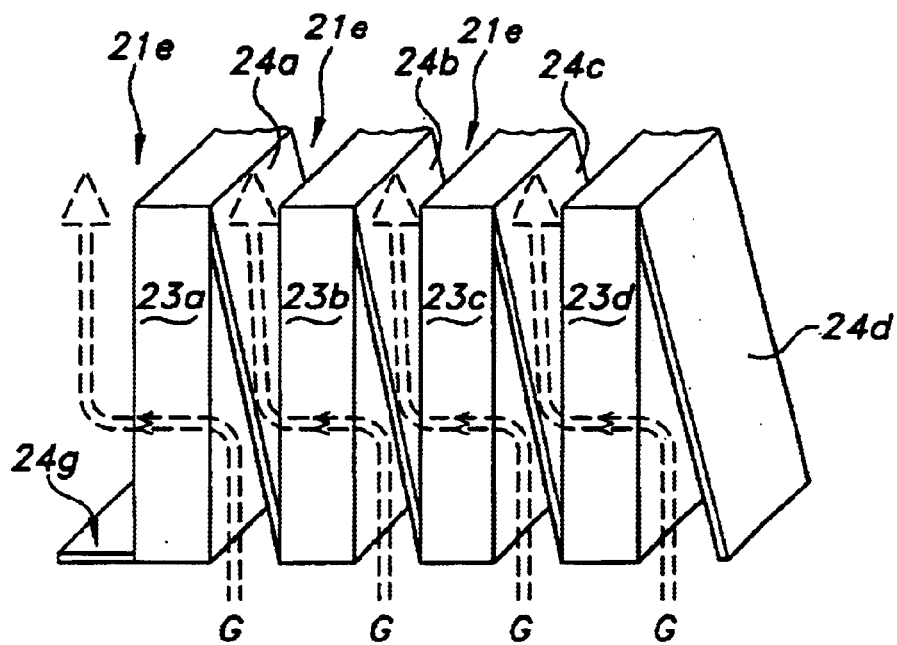
FIG. 4A is a detailed view of the substantially parallel catalyst bed arrangement of the reactor of FIG. 2.

Referring now to FIG. 4A, which shows a portion of the catalyst bed configuration of reactor 20, portions of inlet gas stream G (containing reducing agent) enter respective spaces between the catalyst beds 23a, 23b, 23c, and 23d. The portions of the gas stream rise through the respective spaces and are diverted by inclined deflectors 24a, 24b, 24c, and 24d laterally and parallel through the respective catalyst beds and leftward (as shown) whereupon the treated gas emerges from the opposite side of the catalyst bed and moves upwardly through the space adjacent the opposite side of the catalyst bed which constitutes a portion of passageway 21e leading to the gas stream outlet 21d (FIG. 2). All of the portions of the gas stream move through respective catalyst beds in the same direction.

Figure 3:
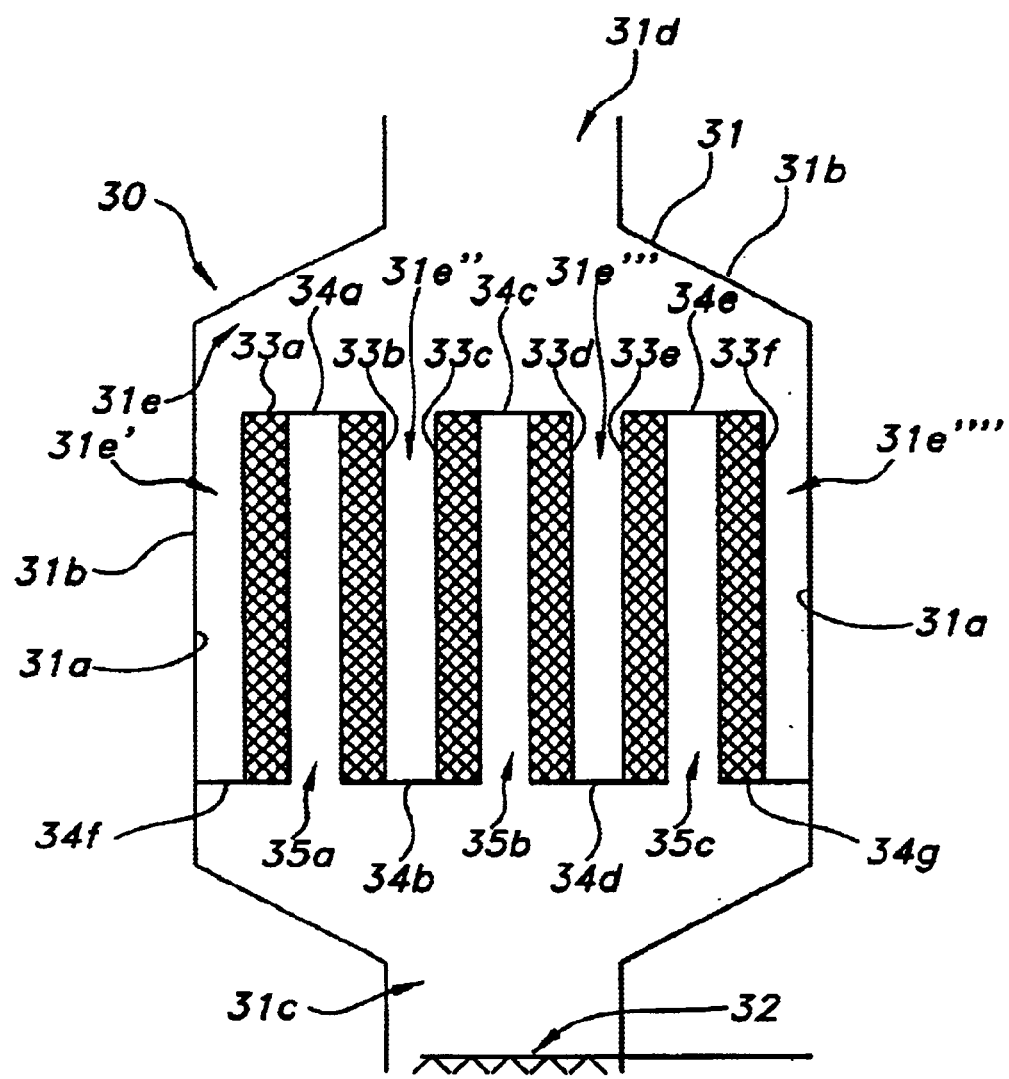
FIG. 3 is a diagrammatic view of an alternative embodiment of the parallel flow reactor.

Referring now to FIG. 3, an alternative reactor configuration is illustrated wherein reactor 30 includes a reactor shell 31 enclosing an interior space. Shell 31 includes inner and outer surfaces 31a and 31b, respectively, an inlet 31c, outlet 31d, and a passageway 31e communicating with outlet 31d providing for the passage of treated gas thereto. Injector 32 can be positioned within inlet 31c or upstream of inlet 31c. The description given above with respect to injector 22 applies also to injector 32.

As shown in FIG. 3, a plurality of catalyst beds 33a, 33b, 33c, 33d, 33e and 33f are spaced apart from each other and arranged in substantially parallel vertically oriented planes. The spaces between the catalyst beds provide passageways for gas stream flow therebetween. Space 31e' between catalyst bed 33a and the inner surface 31a of the shell is part of passageway 31e and provides for the passage of treated gas to outlet 31d. Space 35a between catalyst beds 33a and 33b receives part of the inlet gas stream containing reducing agent. Space 31e" between catalyst beds 33b and 33c is part of passageway 31e and provides for the passage of treated gas to outlet 31d. Space 35b between catalyst beds 33c and 33d receives another part of the inlet gas stream containing reducing agent. Space 31e''' between catalyst beds 33d and 33e is part of passageway 31e and provides for the passage of treated gas to outlet 31d. Space 35c between catalyst beds 33e and 33f receives yet another part of the inlet gas stream containing reducing agent. Space 3e''' between catalyst bed 33f and inner surface 31a of the shell are part of passageway 31e which provides for the passage of treated gas to outlet 31d.

Gas stream deflectors fabricated from gas impervious material such as sheet metal are positioned between the catalyst beds to direct the parallel flow of inlet gas containing the reducing agent laterally through the catalyst beds. For example, deflector 34a extends horizontally from the top edge of catalyst bed 33a to the top edge of adjacent catalyst bed 33b. Deflector 34c extends horizontally from the top edge of catalyst bed 33c to the top edge of adjacent catalyst bed 33d. Deflector 34e extends horizontally from the top edge of catalyst bed 33e to the top edge of adjacent catalyst bed 33f. Deflectors 34a, 34c, and 34e direct the gas laterally through the respective catalyst beds. Wall 34f extends horizontally from the inner surface 31a of the shell to the lower edge of catalyst bed 33a to prevent the inlet gas stream containing reducing agent from bypassing the catalyst bed by entering passageway 31e directly through space 31e'. Wall 34b extends horizontally from the lower edge of catalyst bed 33b to the lower edge of catalyst bed 33c to prevent the inlet gas stream containing reducing agent from bypassing the catalyst bed by entering passageway 31e directly through space 31e''. Wall 34d extends horizontally from the lower edge of catalyst bed 33d to the lower edge of catalyst bed 33e to prevent the inlet gas stream containing reducing agent from bypassing the catalyst bed by entering passageway 31e directly through space 31e'''. Wall 34g extends horizontally from inner surface 31a of the shell to the lower edge of catalyst bed 33f to prevent the inlet gas stream containing reducing agent from bypassing the catalyst bed by entering passageway 31e directly through space 3e''''.

Figure 4B:
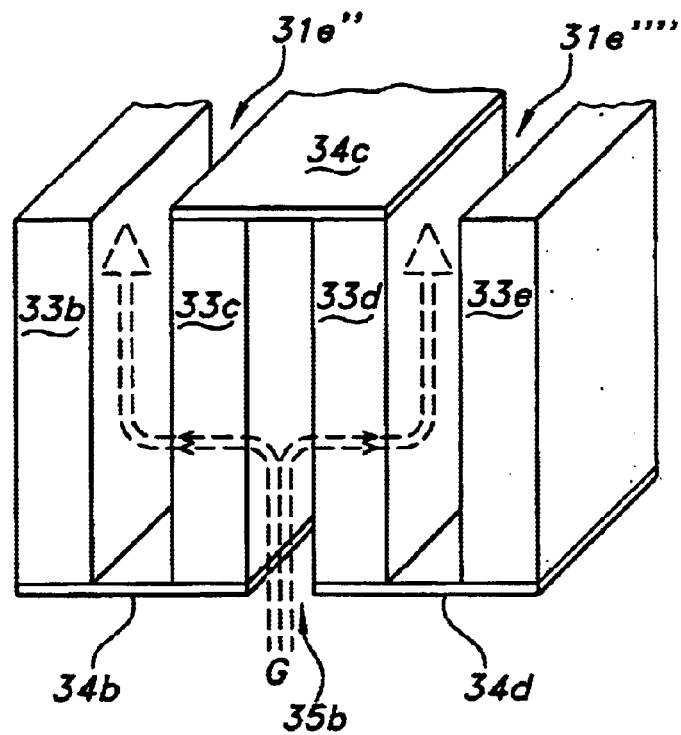
FIG. 4B is a detailed view of the substantially parallel catalyst bed arrangement of the reactor of FIG. 3.

Referring now to FIG. 4B, which shows a portion of the catalyst bed configuration of reactor 30, portions of inlet gas stream G (containing reducing agent) enter space 35b between catalyst beds 33c and 33d. The gas stream rises through space 35b and is diverted to the left and right (as shown) by deflector 34c and laterally and parallel through adjacent parallel beds 33c and 33d. The treated gas emerges from the opposite sides of catalyst beds 33c and 33d into spaces 3e'' and 31e'''.

The SCR catalyst can be in the form of particulate, monolith, or microengineered catalyst ("MEC"), and can be supported on materials such as titania, zeolite, carbon, zirconia, ceramic or silica-alumina.

Figure 5A:
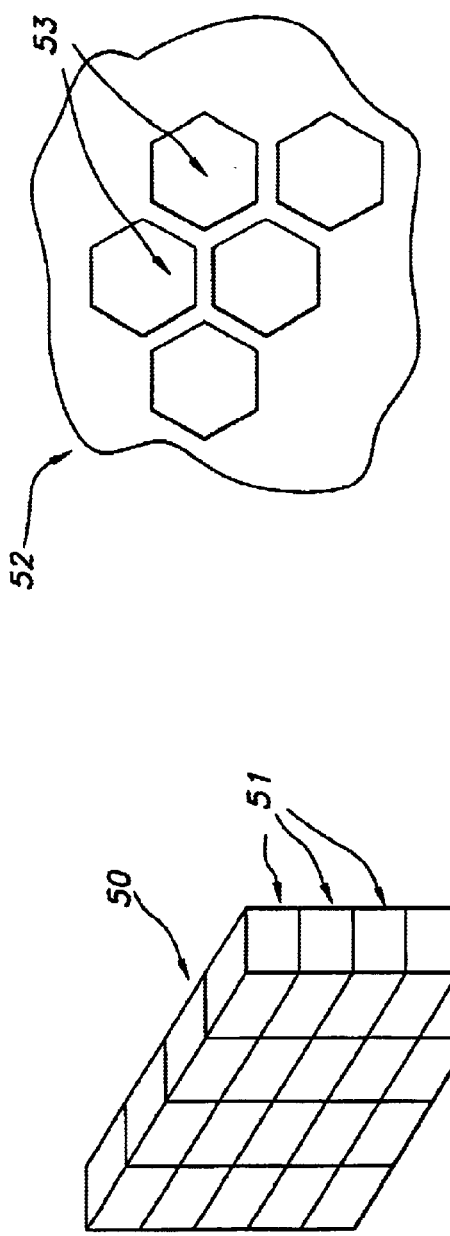
FIG. 5A illustrates a monolithic catalyst bed made up of brick-like units.
Figure 5B:
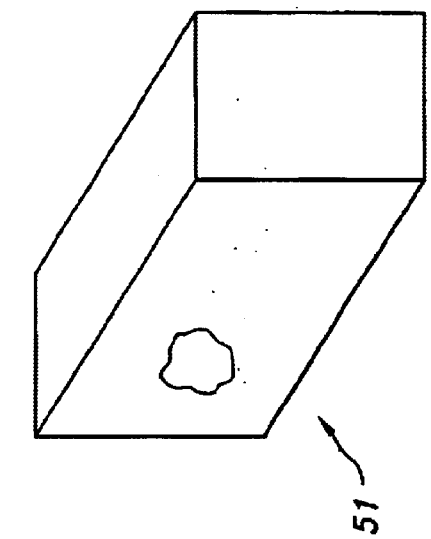
FIG. 5B is a perspective view of a brick-like unit making up the monolithic catalyst bed of FIG. 5A.
Figure 5C:
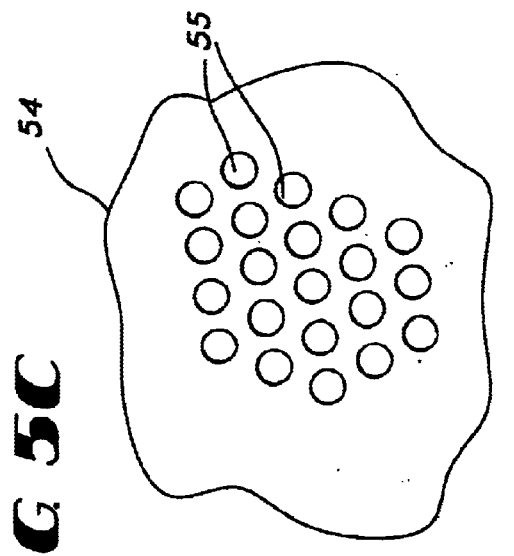
FIGS. 5C and 5D illustrate alternative embodiments of monolith catalyst.
Figure 5D:
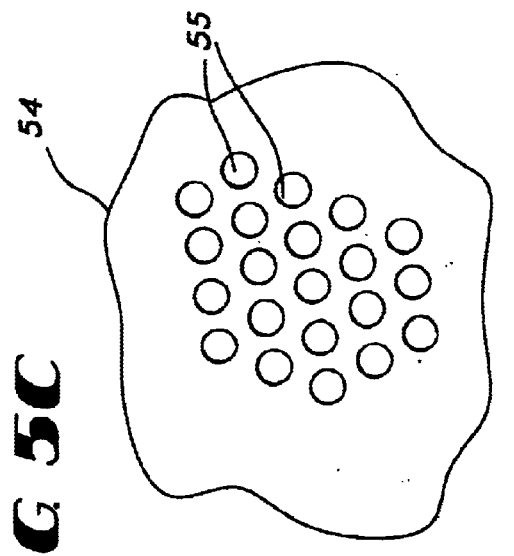

Referring now to FIGS. 5A–5D, the catalyst can be in the form of a monolith 50 which can include a quantity of stacked block-like units 51. Monolith catalyst 50 includes a plurality of parallel channels. As shown in FIG. 5c, monolith 52 possesses a honeycomb structure with hexagonal channels 53. The channels, however, can be of any suitable shape such as square, triangular, T-shapes, and the like. FIG. 5D illustrates a monolith 54 having circular channels 55. The monoliths can be formed by sintering or any other method known to those with skill in the art. Typically, the SCR catalyst is impregnated into the monolith support so as to coat the inner surface of the channels through which the gas stream flows for treatment.

In yet another alternative, the catalyst bed can include a microengineered catalyst ("MEC") wherein the SCR catalyst is supported on a mesh-like structure having a porosity greater than about 85%.

The MEC catalyst is described in copending U.S. patent application Ser. No. 60/222,261 filed Jul. 31, 2000 entitled Conversion of Nitrogen Oxides in the Presence of a Catalyst Supported on a Mesh-Like Structure, the contents of which are herein incorporated by reference herein in their entirety.

The mesh-like material is comprised of fibers or wires, such as a wire or fiber mesh, a metal felt or gauze, metal fiber filter or the like. The mesh-like structure can be comprised of a single layer, or can include more than one layer of wires: e.g., a knitted wire structure or a woven wire structure and preferably is comprised of a plurality of layers of wires or fibers to form a three-dimensional network of materials. In a preferred embodiment, the support structure is comprised of a plurality of layers of fibers that are oriented randomly in the layers. One or more metals can be used in producing a metal mesh. Alternatively, the mesh fibers can include materials in addition to metals.

In a preferred embodiment wherein the mesh-like structure is comprised of a plurality of layers of fibers to form the three-dimensional network of materials, the thickness of such support is at least five microns, and generally does not exceed ten millimeters. In accordance with a preferred embodiment, the thickness of the network is at least 50 microns and more preferably at least 100 microns and generally does not exceed 2 millimeters.

In general, the thickness or diameter of the fibers which form the plurality of layers of fibers is less than about 500 microns, preferably less than about 150 microns and more preferably less than about 30 microns. In a preferred embodiment, the thickness or diameter of the fibers is from about 8 to about 25 microns.

The three dimensional mesh-like structure can be produced by known methods such as any of those described in U.S. Pat. Nos. 5,304,330, 5,080,962; 5,102,745 or 5,096,663 the contents of which are incorporated by reference in their entirety. It is to be understood, however, that such mesh-like structure can be formed by procedures other than those described in the aforementioned patents.

The mesh-like structure that is employed in the present invention (without supported catalyst on the mesh) has a porosity or void volume which is greater than 85%, and preferably is greater than 87% and more preferably is greater than 90%. The term "void volume" as used herein is determined by dividing the volume of the structure which is open by the total volume of the structure (openings and mesh material) and multiplying by 100.

In one embodiment, the catalyst is supported on the mesh-like material without the use of a particulate support. In another embodiment, the catalyst for converting nitrogen oxide(s) is supported on a particulate support that is supported on the mesh-like material. The term "particulate" as used herein includes, and encompasses, spherical particles, elongated particles, fibers, etc. In general, the average particle size of the particulate on which catalyst may be supported does not exceed 200 microns and is typically no greater than 50 microns with the average particle size in the majority of cases not exceeding 20 microns. In general, the average particle size of such particulates is at least 0.002 micron and more generally at least 0.5 microns. When the catalyst supported on the particulate support is coated on the mesh, the average particle size of the catalyst support generally does not exceed 10 microns and, when entrapped in the mesh, generally does not exceed 150 microns.

In an embodiment of the invention, the mesh-like structure that functions as a support for the catalyst is in the form of a shaped structured packing. This packing can be configured as described below in embodiments given by example to provide for turbulence of the gas phase flowing over the catalyst in the reactor. The mesh-like catalyst support structure can be provided with suitable corrugations in order to provide for increased turbulence as described in more detail hereinafter. Alternatively, the mesh-like structure can include tabs or vortex generators to provide for turbulence, also as shown hereinafter. The presence of turbulence generators enhances mixing in the radial (and longitudinal) direction and also improves access to catalyst either coated on or entrapped in the mesh by providing local pressure differential across the mesh, and thus creating a driving force for flow. The structured packing can also be in the form of a module such as a roll of one or more sheets that is placed into the tubes of a reactor such that the channels in the module follow the longitudinal direction of the tube. The roll can comprise sheets that are flat, corrugated or wavy or a combination thereof and the sheets can contain fins or holes to promote mixing. The sheets can also be shaped into corrugated strips that are separated from each other by a flat sheet that exactly fit the size of the tube and are held together by welds, wires, a cylindrical flat sheet or combinations thereof.

It is to be understood that the mesh-like support that supports the catalyst may be employed in a form other than as a structured sheet. For example, the mesh-like support may be formed as rings, particles, ribbons, etc. and employed in a reactor as a packed bed.

The catalyst which is supported on the mesh-like structure can be present on the mesh-like support as a coating on the wires or fibers that form the mesh-like structure and/or can be present and retained in the interstices of the mesh-like structure.

The catalyst can be coated on the mesh-like structure by a variety of techniques, e.g., dipping or spraying. The catalyst particles can be applied to the mesh-like structure by contacting the mesh-like structure with a liquid coating composition (preferably in the form of a coating bath) that includes the particles dispersed in a liquid under conditions such that the coating composition enters or wicks into the mesh-like structure and forms a porous coating on both the interior and exterior portions of the mesh-like structure.

The catalyst is supported on the mesh-like structure in an amount effective to convert nitrogen oxide(s). In general, the catalyst is present in an amount of at least 5%, and preferably at least 10%, with the amount of catalyst generally not exceeding 60% and more generally not exceeding 40%, all by weight, based on mesh and catalyst. In one embodiment where the porosity or void volume of the mesh-like structure prior to adding supported catalyst is greater than 87%, the weight percent of catalyst is from about 5% to about 40%, and when the porosity or void volume is greater than 90%, the weight percent of supported catalyst is from about 5% to about 80%.

Figure 6:
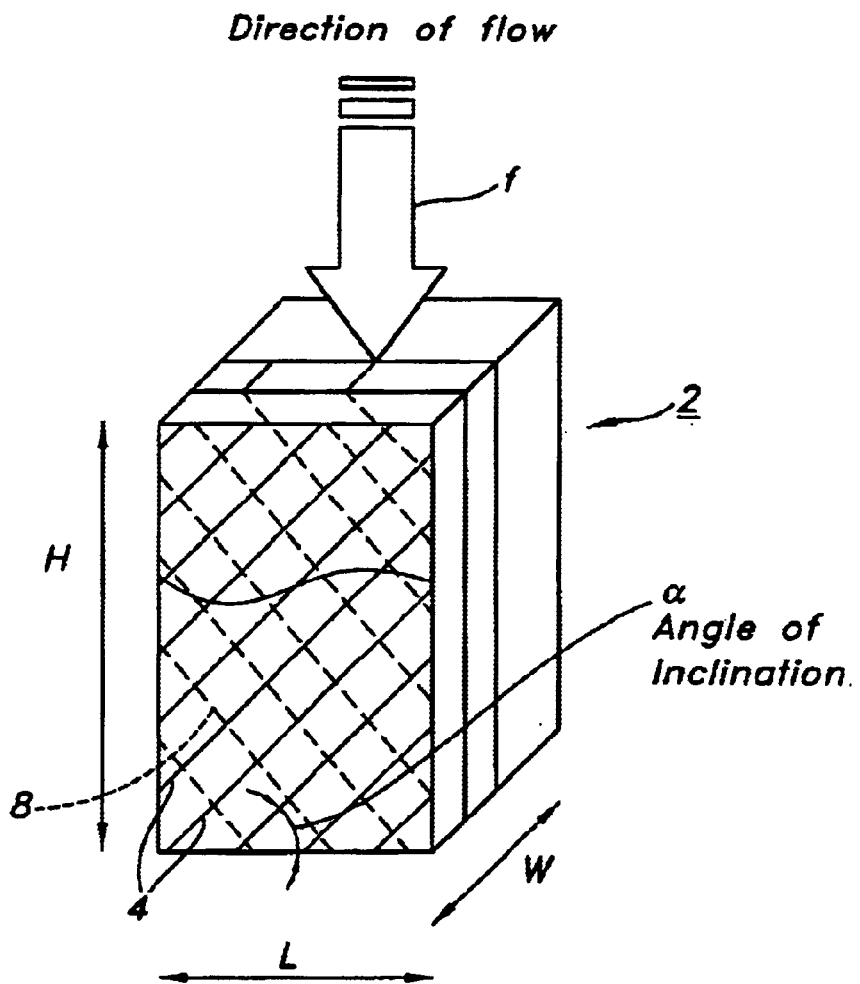
FIG. 6 is an isometric diagrammatic view of a packing structure useful for explaining certain operating principles of the present invention.
Figure 6A:
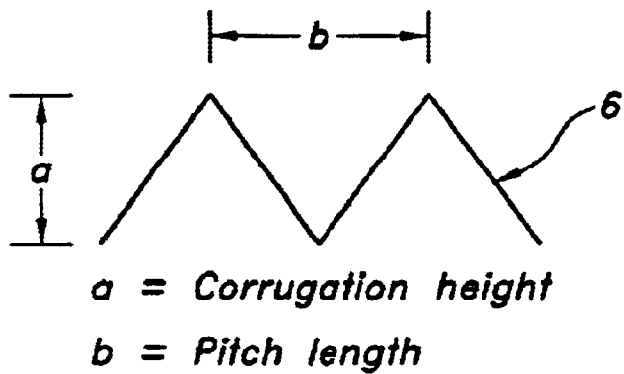
FIG. 6A is a diagram useful for explaining parameters of a corrugated packing material.

Various embodiments of structural packings will now be described. In FIG. 6, packing 2 is diagrammatically representative of a plurality of parallel corrugated sheets of porous mesh material (referred to herein as MEC material) in which the corrugations 4 are represented by diagonal lines which are at an angle $\alpha$ to the vertical direction of flow f. FIG. 6A, a representative cross section of a corrugation 6. Adjacent corrugated sheets 8 alternate 90° from each other.

Figure 7:
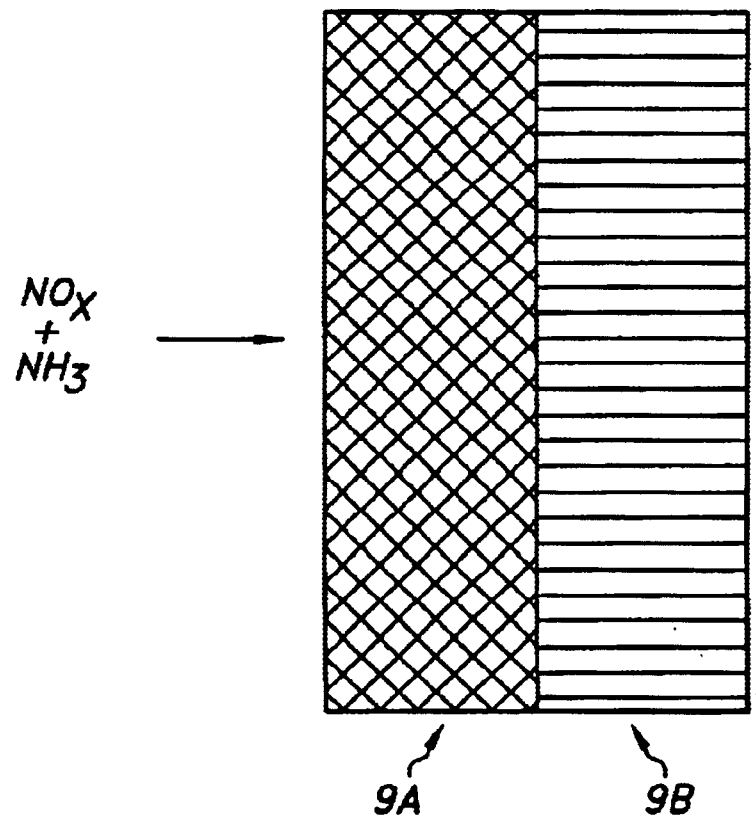
FIG. 7 is a diagrammatic view of a combination of microengineered catalyst and monolith catalyst.

In FIG. 7, a conventional monolith honeycomb structure 9B is combined with MEC mesh material 9A of the present invention for providing a combined catalyst bed structure for the SCR conversion of $NO_x$. The combined structure provides improved conversion. The increase in conversion is believed to be caused by the improved mixing of the structure creating an improved efficiency of the downstream honeycomb monolith.

Figure 8:
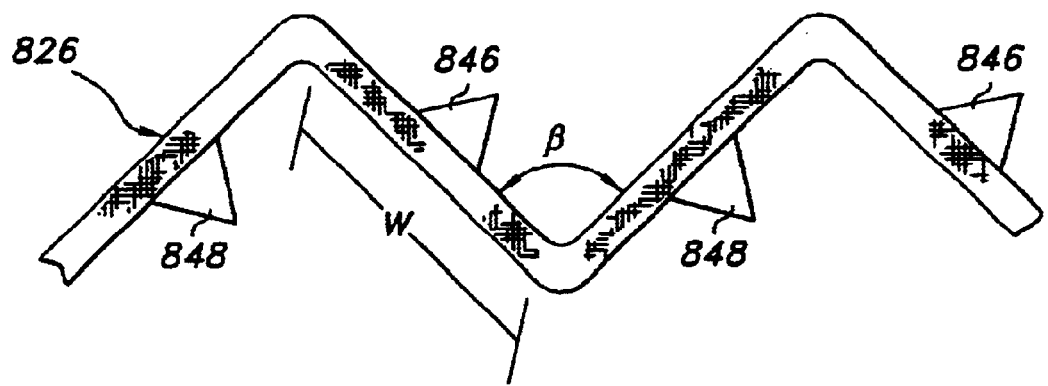
FIG. 8 is an end view of a portion of a packing element.

Referring to FIG. 8, the MEC mesh material can be fabricated from elements 826 of sheet material and can optionally include vortex generators for increasing turbulence of the gas flow therethrough. In FIG. 8, optional vortex generators 846 and 848 are triangular and bent from the plane of the element 826 sheet material. The generators 846 and 848 alternate in the direction in which they project from the plane of the sheet material as best seen in FIG. 8. The corrugations have a width w. By providing additional turbulence, the vortex generators further promote fluid flow through the pores of the MEC material due to the pressure differential thereacross. The side walls of element 826 are inclined at an angle $\beta$ of about 90°. The roots and crests extend in a linear direction.

The Example below illustrates the operation of the axial flow gas phase reactor and deNOx method of this invention.

EXAMPLE

A parallel flow gas phase reactor as shown in FIG. 2 is employed for the selective catalytic reduction of $NO_x$ in a flue gas stream of two furnaces under the following flue gas conditions:

Flow rate=360,000 lbs/hr

Temperature=360° F. (182° C.)

$NO_x$ content=100 ppm

A sufficient amount of ammonia is added to the flue gas to achieve the desired reduction of $NO_x$. The catalyst employed is MEC coated with $V_2O_5/TiO_2$ catalyst. A desired $NO_x$ reduction of 90% to 10 ppm requires about 54 $m^3$ of the MEC catalyst. This volume is accommodated by a parallel flow reactor containing 8 parallel beds of 0.5 meter thickness and spaced 0.15 meters apart. The beds have a width and length of 3 meters and 6 meters, respectively. The height of the combined beds is about 5 meters. No additional volume is required to compensate for velocity maldistribution.

The effective bed length through which the flue gas must pass for treatment is only about 0.6 meter. The resulting pressure loss is only about 0.07 inches $H_2O$ through the catalyst bed, which is increased to 0.2 inches because of changes in flow direction.

In contrast to the parallel flow reactor of the Example, to achieve the same 90% reduction of $NO_x$, an axial flow reactor employs a 3×6×4×meter bed and 10% to 20% additional catalyst volume to accommodate the velocity maldistribution at the inlet conditions. The pressure drop through such a reactor bed is about 5 inches $H_2O$, which is about 25 times greater than that of the reactor of the Example.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. A parallel flow gas phase reactor for the chemical conversion of nitrogen oxide in a gas stream which comprises:

a) a shell having interior and exterior surfaces, a gas stream inlet for receiving an inlet gas stream having an initial concentration of nitrogen oxide and a gas stream outlet through which treated gas of reduced nitrogen oxide concentration relative to the nitrogen oxide concentration of the inlet gas stream is discharged;

b) an injector for introducing a reducing agent into the inlet gas stream; and, c) a plurality of substantially planar catalyst beds within the reactor shell, each catalyst bed containing at least one nitrogen oxide conversion catalyst for the selective catalytic reduction of nitrogen oxide in the inlet gas stream to provide a treated gas of reduced nitrogen oxide concentration, the catalyst beds being oriented substantially parallel with, and in spaced-apart relationship to, each other and to the interior surface of the reactor shell with gas flow passageways therebetween, the passageways each including a gas stream deflector positioned therein for directing the flow of inlet gas stream through at least one catalyst bed and treated gas to the gas stream outlet.

2. The reactor of claim 1 wherein the injector is an injector grid positioned upstream of the gas stream inlet of the reactor shell.

3. The reactor of claim 1 further including a fan for increasing the pressure of inlet gas stream within the reactor shell.

4. The reactor of claim 1 wherein each gas flow passageway has a downstream end and an upstream end and wherein the deflector positioned in each gas flow passageway extends from the edge of the downstream end of one catalyst bed to the edge of the upstream end of an adjacent catalyst bed.

5. The reactor of claim 1 wherein each gas flow passageway has a downstream end and an upstream end, one of said downstream and upstream ends being open, the other of said downstream and upstream ends closed by the deflector, wherein every other gas stream passageway is closed at the downstream end.

6. The reactor of claim 1 further comprising:
   d) a furnace which produces a flue gas containing nitrogen oxide; and,
   e) a conduit for conveying flue gas from the furnace to the gas stream inlet of the reactor shell.

7. The reactor of claim 1 wherein each catalyst bed is a monolith.

8. The reactor of claim 1 wherein each catalyst bed comprises catalyst supported on a mesh-like structure.

9. A method for the selective catalytic reduction of nitrogen oxide in a gas which comprises:
   a) introducing a reducing agent into a gas stream containing nitrogen oxide, the gas stream containing reducing agent having a temperature sufficient for the catalyzed reduction of nitrogen oxide with the reducing agent; and,
   b) passing the gas stream containing reducing agent through a plurality of substantially parallel planar catalyst beds, each catalyst bed containing at least one nitrogen oxide conversion catalyst effective for the selective catalytic reduction of nitrogen oxide in the presence of reducing agent, wherein the gas stream is divided into a plurality of portions, each portion being passed through a respective catalyst bed.

10. The method of claim 9 wherein each catalyst bed is a monolith.

11. The method of claim 9 wherein each catalyst bed comprises catalyst supported on a mesh-like structure.

* * * * *